(12) United States Patent
Dutta et al.

(10) Patent No.: US 10,870,398 B2
(45) Date of Patent: Dec. 22, 2020

(54) VEHICLE WITH HYPERLAPSE VIDEO AND SOCIAL NETWORKING

(71) Applicant: FORD GLOBAL TECHNOLOGIES, LLC, Dearborn, MI (US)

(72) Inventors: Arun Dutta, Ann Arbor, MI (US); Alexander Groh, Detroit, MI (US); Ali Hassani, Ann Arbor, MI (US); Dylan Verster, Northville, MI (US); John William Schmotzer, Canton, MI (US); Pol Llado, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/811,027

(22) Filed: Jul. 28, 2015

(65) Prior Publication Data

US 2017/0028935 A1    Feb. 2, 2017

(51) Int. Cl.
| | |
|---|---|
| *B60R 11/04* | (2006.01) |
| *H04N 21/4223* | (2011.01) |
| *H04N 21/61* | (2011.01) |
| *G07C 5/08* | (2006.01) |
| *H04N 21/414* | (2011.01) |

(52) U.S. Cl.
CPC ............ *B60R 11/04* (2013.01); *G07C 5/0866* (2013.01); *H04N 21/41422* (2013.01); *H04N 21/4223* (2013.01); *H04N 21/6181* (2013.01)

(58) Field of Classification Search
CPC ..... B60R 11/04; H04N 5/232; H04N 5/23222
USPC ..................... 701/36; 348/149; 382/154, 199
See application file for complete search history.

(56) References Cited

U.S. PATENT DOCUMENTS

| | | | |
|---|---|---|---|
| 8,340,694 B2 | 12/2012 | Forstall et al. | |
| 9,082,018 B1* | 7/2015 | Laska | G06K 9/00711 |
| 9,158,974 B1* | 10/2015 | Laska | H04N 5/2628 |
| 9,554,043 B2 | 1/2017 | Grundmann et al. | |

(Continued)

FOREIGN PATENT DOCUMENTS

| | | |
|---|---|---|
| CN | 104202673 A | 12/2014 |
| GB | 2492397 A | 1/2013 |
| RU | 139576 U1 | 4/2014 |

OTHER PUBLICATIONS

Kopf et al., First Person Hyper-Lapse Videos; 10 pages.

(Continued)

*Primary Examiner* — Peter D Nolan
*Assistant Examiner* — Luke Huynh
(74) *Attorney, Agent, or Firm* — Gregory P. Brown; Brooks Kushman P.C.

(57) ABSTRACT

A vehicle is described that includes a video camera configured to record video, a processor configured to process the recorded video from the video camera into hyperlapse video, and an input/output device to link the hyperlapse video with a social network associated with at least one of a driver of the vehicle and the vehicle. The processor may be configured to receive video data from the video camera and to create the hyperlapse video by reconstructing a video stream from the video data, planning a smooth path through the video stream, and rendering the video data along the smooth path into the hyperlapse video that has a faster speed and less jitter than the video stream. The hyperlapse video may be a non-native, sped-up video of the recorded video from the video camera.

20 Claims, 4 Drawing Sheets

(56) References Cited

U.S. PATENT DOCUMENTS

| | | | |
|---|---|---|---|
| 2003/0095688 A1* | 5/2003 | Kirmuss | B60R 11/02 |
| | | | 382/105 |
| 2009/0262202 A1 | 10/2009 | Leonard | |
| 2011/0102637 A1* | 5/2011 | Lasseson | G01C 21/3647 |
| | | | 348/239 |
| 2011/0113461 A1 | 5/2011 | Laganiere et al. | |
| 2012/0314040 A1 | 12/2012 | Kopf et al. | |
| 2014/0105564 A1* | 4/2014 | Johar | H04N 5/915 |
| | | | 386/226 |
| 2014/0277833 A1* | 9/2014 | Palan | G07C 5/00 |
| | | | 701/1 |
| 2014/0365849 A1 | 12/2014 | Ishmael | |
| 2015/0248916 A1* | 9/2015 | Kopf | G11B 27/034 |
| | | | 386/278 |
| 2016/0127641 A1* | 5/2016 | Gove | G03B 15/006 |
| | | | 348/143 |
| 2016/0148648 A1* | 5/2016 | Dimson | H04N 5/222 |
| | | | 386/280 |
| 2016/0330399 A1* | 11/2016 | Joshi | G11B 27/02 |

OTHER PUBLICATIONS

Neel Joshi et al., "Real-Time Hyperlapse Creation Via Optimal Frame Selection", Journal ACM Transaction on Graphics (TOG) vol. 34 Issue 4. Aug. 2015 ACM, New York, NY, USA doi10.1145/2766954, 9 pgs.

\* cited by examiner

VEHICLE WITH HYPERLAPSE VIDEO AND SOCIAL NETWORKING

TECHNICAL FIELD

The present disclosure is generally directed to a motor vehicle with video processing methods and systems that can produce hyperlapse video and share the video over various networks.

BACKGROUND

Vehicles can have cameras that produce video showing the travel of the vehicle. It may be desirable to have video of such travels and to share the video with others. However, vehicle video may not be suitable for viewing due to its length and vibrations or jitter.

SUMMARY

A vehicle is described that includes a video camera configured to record video. The camera may be a vehicle mounted camera. A vehicle processor is configured to process the recorded video from the video camera into hyperlapse video. The vehicle includes an input/output device to link the hyperlapse video with a social network associated with at least one of the driver of the vehicle and the vehicle. In an example, the input/output device is a mobile phone. In an example, the input/output device includes a network communication device in the vehicle.

In an example, the vehicle includes a processor configured to reconstruct a video stream from the video data, plan a smooth path through the video stream, and render the video data along the smooth path into a hyperlapse video that has a faster speed and less jitter than the video stream. The vehicle may also include an input/output device configured to link the hyperlapse video with a social network.

In an example, the input/output device is a mobile phone.

In an example, the input/output device includes a network communication device in the vehicle.

In an example, the hyperlapse video is not a native, sped-up video of the recorded video.

In an example, the video camera is further configured to record from vehicle activation and to store the recorded video in a memory in the vehicle.

In an example, the processor is further configured to generate the hyperlapse video while the video camera records additional video data.

In an example, the processor is further configured initiate recording of the video data and generating of the hyperlapse video based on a location of the vehicle.

In an example, the processor is further configured to send the hyperlapse video to an external processor that is configured to combine the hyperlapse video with video from other sources.

In an example, the input/output device includes an application on a mobile phone that connects to a computer in the vehicle and a computer of the social network.

A method for a vehicle, according to examples described herein, may include recording video data using a vehicle camera and processing, using a vehicle processor, the video data into hyperlapse video. In an example, the hyperlapse video is output to a social network associated with at least one of a driver of the vehicle and the vehicle.

In an example, the outputting includes outputting the video through a portable device in communication with both the vehicle and the social network.

In an example, the outputting includes outputting the video over a network communication device in the vehicle.

In an example, the processing includes reconstructing a video stream from the video data, planning a smooth path through the video stream, and rendering the video data along the smooth path into the hyperlapse video that has a faster speed and less jitter than original video.

In an example, the hyperlapse video is not a native, sped-up video of the recorded video from the vehicle camera.

In an example, the recording begins with vehicle activation.

In an example, the recording and processing are initiated based on a location of the vehicle.

In an example, the recording includes receiving information from a source external to the vehicle that the vehicle is near an event trending in social media.

A further method for sharing vehicle video data may include, by a computer, reconstructing video frames via statistical modeling of video data, identifying a path through the reconstructed video frames that minimizes data loss and smooths transitions between the reconstructed video frames, rendering hyperlapse video using the identified path through the video data, and outputting the hyperlapse video from the vehicle to a social network.

In an example, the rendering includes creating the hyperlapse video to not be a native, sped-up video of the recorded video.

In an example, the recording is from vehicle activation and storing the recorded video in a memory in the vehicle before reconstructing, identifying and rendering.

In an example, the rendering is performed while a video camera records additional video data.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is popular today to share videos on social networking sites or through other electronic communication means. However, some videos are generally long and may not be enjoyed. This may be true for vehicle travel videos. While a shortened video may be produced by skipping frames (e.g., time-lapsing), the resulting video may contain movements between frames that are very sudden and gives the impression that the camera is constantly shaking. In some instances, people may not view such poor quality shaking video at all. A vehicle may process that video data using hyperlapse techniques to produce a shortened video that is smoother, which is more watchable to a viewer. A hyperlapse video is also shortened in time and may be smoother, with less sudden movement, than the original real-time video or a traditional sped-up video. In some example, the vehicle's hyperlapse video may have all the benefits of time-lapsing without the violent transitions between frames. The vehicle's hyperlapse video will have smoothed transitions, giving the impression that the viewer is gliding through the scene of the recording, e.g., outside the vehicle.

In an example, the vehicle will have a processor that can apply a hyperlapse technique(s) to video from vehicle dash cameras, vehicle front facing cameras and other vehicle cameras. As a result, the vehicle can provide a new range of features relative to video and share recorded events over the whole course of a complete drive or during a period of interest during the drive. By reducing the time length of the video and removing the shake in the reduced time video, the video can be extended to show not just what happened in one particular instance of the drive and can show an entire drive. The vehicle's video processor can process the video to a hyperlapse video in the car. For long drives, the vehicle could record a certain amount of video while having the processor process an earlier portion of the recording into the hyperlapsed video. This task parallelization of recording and processing would save processing time and memory space.

The video may be geotagged is to add geographical metadata, such as location data or GPS, data to items such as pictures or video. This can be used to sort through items to view or display video from a specific location, or group items that are relatively close to each other. The vehicle may have built-in navigation system, e.g. a global positioning system ("GPS"). The video can be paired with other data to provide location information in the video.

The user, e.g., a vehicle driver, can control how the video information is shared by the vehicle. Raw video may be too large for sharing. Reduced time video, i.e., video that is merely sped up, may not have sufficient quality that viewers will want to watch the reduced time video. Using a hyperlapse technique to shorten a video into a smooth, time-shortened video clip enables the user to share these hyperlapse videos on social networking sites. In an example, time-shortening a video may mean showing the entire trip in distance but shortening the time it takes for the video to play relative to same distance. Long, scenic road trips (e.g., a couple hours or more) can be condensed into minutes. The user can use the hyperlapse video to share directions to an event, to share a point of interest, or share an event that has a current happening of interest.

In an example, the vehicle may have a video output device to send the hyperlapse video to a storage device off the vehicle or share the hyperlapse video on a social network site. The video output can communicate directly to the off-site storage via a network. The vehicle can also link to a mobile phone, which can be in short range communication with the vehicle. The mobile phone may share the hyperlapse video with the off-site storage or social network. In an example, the user may wish to perform additional video editing using the hyperlapsed video before sharing. In that case, the user may have the vehicle store the hyperlapse video until the vehicle arrives at familiar communication network. A familiar communication network may be a network for which the vehicle has previously stored the login information. Once in range, the vehicle would upload the video onto a shared-drive on a computer of the user. This would allow the user to go the computer and further edit the hyperlapse video.

Figure 1:
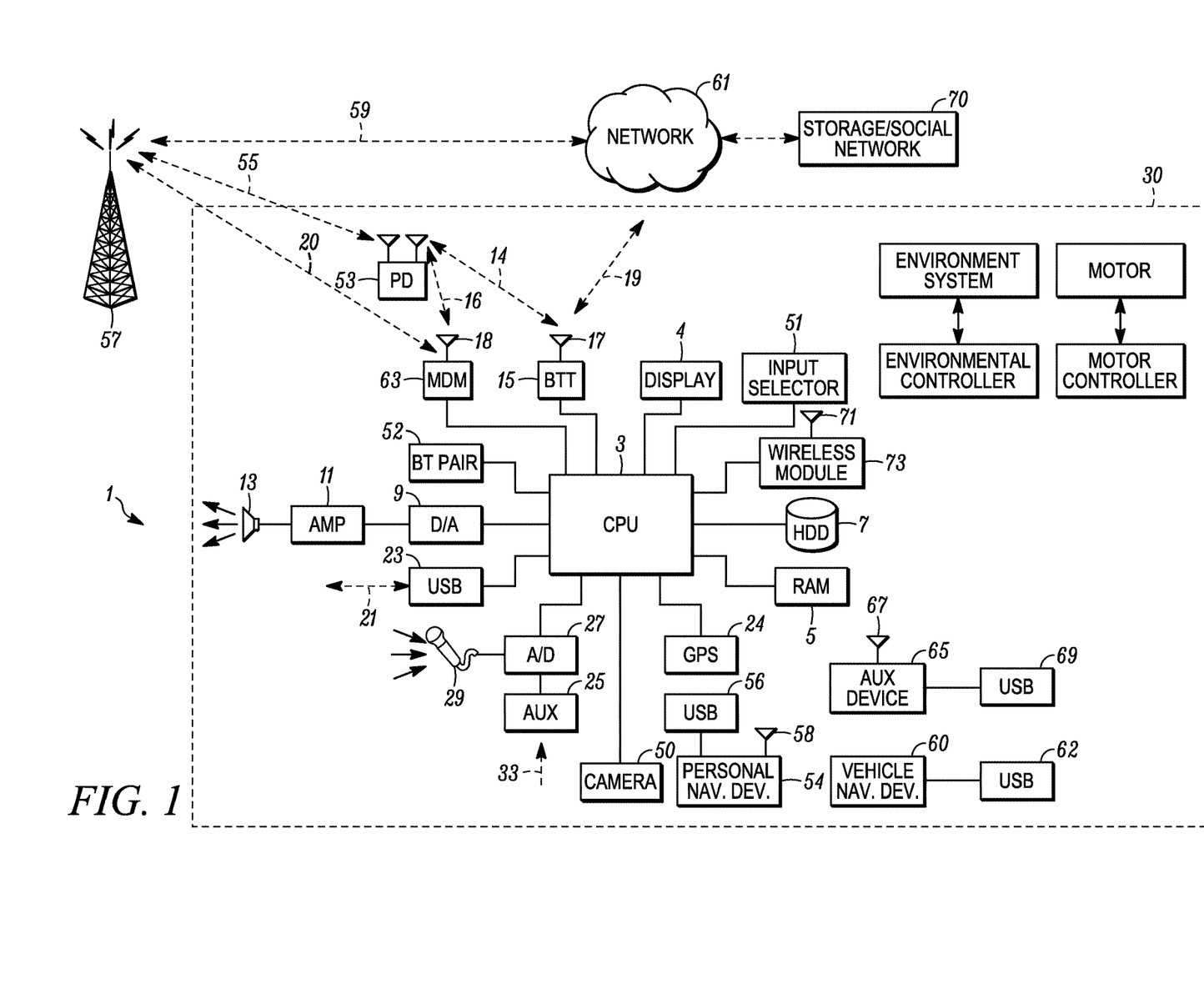
FIG. 1 is a schematic view of a vehicle according to an example embodiment.

FIG. 1 illustrates an example block topology for a vehicle-based computing system 1 (VCS) for a vehicle 30. An example of such a vehicle-based computing system 1 is the SYNC system manufactured by THE FORD MOTOR COMPANY. A vehicle enabled with a vehicle-based computing system may contain a visual front end interface 4 located in the vehicle 30. The user may also be able to interact with the interface if it is provided, for example, with a touch sensitive screen. In another illustrative embodiment, the interaction occurs through, button presses, spoken dialog system with automatic speech recognition and speech synthesis. The interface 4 may include an electronic control module that uses hardware to execute controls to provide a display and interaction with a user, e.g., the vehicle driver.

In the illustrative embodiment shown in FIG. 1, a processor 3 is fixed in the vehicle. The processor 3 may be central processing unit (CPU), processor, logic circuits or a combination of machine instructions and hardware, which may control at least some portion of the operation of the vehicle-based computing system. Provided within the vehicle 30, the processor 3 allows onboard processing of commands, controls and routines, e.g., processing video data from an onboard video camera 50. In an example, the processor 3 may reduce the length of the video while reducing the jitter in the video from the vehicle. Further, the processor 3 is connected to both non-persistent storage 5 and persistent storage 7. In this illustrative embodiment, the non-persistent storage 5 is random access memory (RAM) and the persistent storage 7 is a hard disk drive (HDD) or flash memory. In general, persistent (non-transitory) storage 7 can include all forms of memory that maintain data when a computer or other device is powered down. These include, but are not limited to, solid state hard drives, HDDs, read/write compact disks (CDs), read/write digital versatile disks (DVDs), magnetic tapes, solid state drives, portable universal serial bus (USB) drives and any other suitable form of persistent storage 7. Other forms of persistent memory include flash memory (NAND Flash and NOR Flash) and embedded MultiMediaCard (eMMC). In an example, the storage 7 has a storage size, e.g., one gigabyte, or multiple gigabytes, that is less than twice the total size of the controls being stored therein. The storage 7 can store both raw video data from the camera 10 and processed video (e.g., reduced length video, time-lapse video, hyperlapse video and the like) from the processor 3.

The processor 3 is also provided with a number of different inputs allowing the user to interface with the processor 3. In this illustrative embodiment, a microphone 29, an auxiliary input 25 (for input 33), a USB input 23, a global positioning system (GPS) input 24, the screen 4, which may be a touchscreen display, and a BLUETOOTH input 15 are all provided. Each of these inputs may include an electronic control module that executes controls for the various electronics of the inputs to operate. An input selector 51 is also provided, to allow a user to swap between various inputs. Input to both the microphone and the auxiliary connector is converted from analog to digital by a converter 27 before being passed to the processor 3. Although not shown, numerous vehicle components and auxiliary components in communication with the VCS 1 may use a vehicle network (such as, but not limited to, a controller area network (CAN) bus) to pass data to and from the VCS 1 (or components thereof). Such vehicle components can be controlled by the processor 3, other electronic circuitry, or electronic control modules that execute controls, which can be in the form of hardware or hardware executing the controls for a specific vehicle component. While described embodiments relate to vehicle controls, other controls embedded in other systems and devices may also use the memory schemes described herein to allow for efficient updating of control instructions for multiple modules in such a system. Other modules can include engine control modules, operational control modules, safety modules, and the like. In operation, the user (e.g., the driver of the vehicle) may speak a command (e.g., a "record" command) that is sensed by the microphone. The location system (e.g., GPS system) can provide location information that can be stored with the video in the storage 7 and processed with the video data by the processor 3.

Outputs from the VCS system 1 can include, but are not limited to, a visual display 4 and a speaker 13 or stereo system output. The speaker 13 is connected to an amplifier 11 and receives its signal from the processor 3 through a digital-to-analog converter 9. Output can also be made to a remote BLUETOOTH device such as personal navigation device (PND) 54 or a USB device such as vehicle navigation device 60 along the bi-directional data streams shown at 19 and 21 respectively. Each of these outputs may include an electronic control module that executes controls for the various electronics of the inputs to operate. In some examples, the VCS system executes controls, e.g., through electronic circuitry or electronic control modules that execute controls. The visual display 4 and the speaker 13 can operate to display the processed video, e.g., a hyperlapse video, in the vehicle.

In one illustrative embodiment, the system 1 uses the BLUETOOTH transceiver 15 to establish a communication link 17 with a portable device 53 (e.g., cell phone, smart phone, PDA, or any other device having wireless remote network connectivity). The portable device 53 can then be used to establish a communication link 59 with a network 61 outside the vehicle 30 through, for example, communication 55 with a cellular tower 57. In some embodiments, tower 57 may be a Wi-Fi access point. Exemplary communication between the portable device 53 and the BLUETOOTH transceiver is represented by communication link 14. In an example, the portable device 53 can link the vehicle, e.g., any hyperlapse video, to a remote storage or a social network 70.

Pairing a portable device 53 and the BLUETOOTH transceiver 15 can be instructed through a button 52 or similar input. Accordingly, the processor is instructed that the onboard BLUETOOTH transceiver 15 will be paired with a BLUETOOTH transceiver in a portable device 53.

Data may be communicated between processor 3 and network 61 utilizing, for example, a data-plan, data over voice, or dual-tone multiple frequency (DTMF) tones associated with portable device 53. Alternatively, it may be desirable to include an onboard modem 63 having antenna 18 to communicate 16 data between processor 3 and network 61 over the voice band. The portable device 53 can then be used to communicate 59 with a network 61 outside the vehicle 30 through, for example, communication 55 with a cellular tower 57. In some embodiments, the modem 63 may establish communication 20 with the tower 57 for communicating with network 61. As a non-limiting example, modem 63 may be a USB cellular modem 63 and communication 20 may be cellular communication. The processed video on the vehicle can be sent from the vehicle using the portable device 53 and, in some embodiments, the network 61, to a remote storage or social network 70.

In one illustrative embodiment, the processor 3 is provided with an operating system (e.g., instructions being executed in a machine) including an API to communicate with modem application software. The modem application software may access an embedded module or firmware on the BLUETOOTH transceiver to complete wireless communication with a remote BLUETOOTH transceiver (such as that found in a portable device). Bluetooth is a subset of the Institute of Electrical and Electronics Engineers (IEEE) 802 personal area network (PAN) protocols. IEEE 802 local area network (LAN) protocols include wireless fidelity (Wi-Fi) and have considerable cross-functionality with IEEE 802 PAN. Both are suitable for wireless communication within a vehicle 30. Another communication strategy that can be used in this realm is free-space optical communication (such as infrared data association (IrDA)) and non-standardized consumer infrared (IR) protocols.

A camera 50 is mounted in the vehicle 30 and may communicate with either the processor 3 or the memory 7. The camera 50 may further include its own internal memory and processors to take video or still pictures for storage. The camera 50 may be fixed to the front of the vehicle, e.g., in the front grille or in the bumper. In an example, the camera 50 is mounted on the dashboard inside the vehicle interior. The camera 50 can further include multiple imagers that can be linked together to form a camera system. The camera can further be mounted on the sides of the vehicle or in the side mirrors. In an example, the camera 50 is a charge-coupled device capable of high definition imaging, e.g., 1080i, 1080p or 720p formats. The camera 50 may record video of the environment through which the vehicle is traveling. The processor 3 can control the camera to start and stop recording based on stored settings in the vehicle computing system 1. The driver of the vehicle 30 may launch recording using the camera 50 via buttons as inputs or via voice commands sensed through microphone 29.

In another embodiment, portable device 53 includes a modem for voice band or broadband data communication. In the data-or-voice embodiment, a technique known as frequency division multiplexing may be implemented where the owner of the portable device 53 can talk over the device while data is being transferred. At other times, when the owner is not using the device, the data transfer can use the whole bandwidth (300 Hz to 3.4 kHz in one example). While frequency division multiplexing may be common for analog cellular communication between the vehicle 30 and the Internet, and is still used, it has been largely replaced by hybrids of Code Domain Multiple Access (CDMA), Time Domain Multiple Access (TDMA), and Space-Domain Multiple Access (SDMA) for digital cellular communication. These are all ITU IMT-2000 (3G) compliant standards and offer data rates up to 2 Mbs for stationary or walking users and 385 kbs for users in a moving vehicle 30. 3G standards are now being replaced by IMT-Advanced (4G) which offers 200 Mbs for users in a vehicle 30 and 1 Gbs for stationary users. If the user has a data-plan associated with the portable device 53, it is possible that the data-plan allows for broadband transmission and the system could use a much wider bandwidth (speeding up data transfer). In still another embodiment, portable device 53 is replaced with a cellular communication device (not shown) that is installed to vehicle 30. In yet another embodiment, the portable device 53 may be a wireless LAN device capable of communication over, for example (and without limitation), an 802.11g network (i.e., Wi-Fi) or a WiMax network.

In one embodiment, incoming data can be passed through the portable device 53 via a data-over-voice or data-plan, through the onboard BLUETOOTH transceiver and into the processor 3 of the vehicle 30. In the case of certain temporary data, for example, the data can be stored on the HDD or other storage media 7 until such time as the data is no longer needed.

Additional sources that may interface with the vehicle 30 include a PND 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the processor 3 could be in communication with a variety of other auxiliary devices 65. These devices 65 can be connected through a wireless connection 67 or a wired connection 69. Auxiliary device 65 may include, but are not limited to, personal media players, wireless health devices, portable computers, portable storage devices and the like.

Also, or alternatively, the processor 3 could be connected to a vehicle-based wireless router adapter 73, using for example a Wi-Fi (IEEE 802.11) transceiver 71. This could allow the processor 3 to connect to remote networks within range of the local router 73.

In addition to having exemplary processes executed by a vehicle computing system located in a vehicle 30, in certain embodiments, the exemplary processes may be executed at least in part by one or more computing systems external to and in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process includes a step of sending or receiving information with a paired wireless device, then it is likely that the wireless device is not performing the process, since the wireless device would not "send and receive" information with itself. One of ordinary skill in the art will understand when it is inappropriate to apply a particular VAC to a given solution. In all solutions, it is contemplated that at least the VCS 1 located within the vehicle 30 is itself capable of performing the exemplary processes, e.g., processing video into hyperlapse video and sharing the processed video to off-vehicle storage or a social networking site (a social network server).

The vehicle 30 also includes a motor, e.g., an internal combustion engine or an electric motor, which is controlled by a motor controller. The motor controller may be in communication with the processor 3, which can embed motor data in the video being processed into a time-lapse video or a hyperlapse video. The vehicle may further include an environment system that controls the interior compartment of the vehicle. An environmental controller is connected to the environmental system to control its operation, e.g., heating, cooling, air flow, defrosting, and the like. The environmental controller may further sense the exterior environment, e.g., temperature, sunlight, humidity. Such data in the environmental controller may be communicated to the processor 3 for inclusion in the any video processed by the processor 3.

Figure 2:
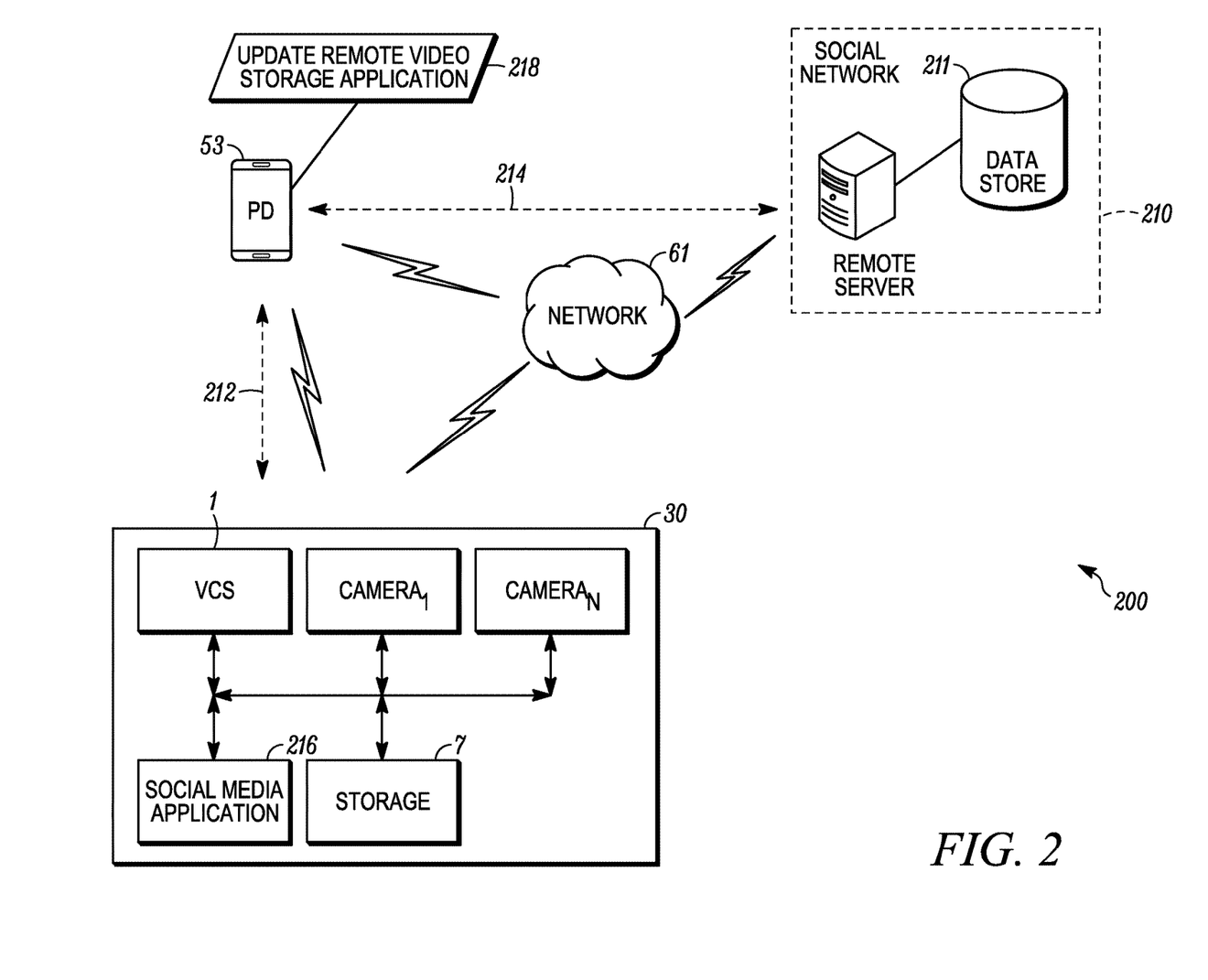
FIG. 2 is a schematic view of a communication including a vehicle according to an example embodiment.

FIG. 2 illustrates the vehicle 30 in communication with the system 200 for providing video and other data to a social networking site 210 by way of electrical or electronic communication, e.g., directly via a wireless or wired network 61 or through the portable device 53. The system 200 may include the VCS 1 in communication over the network 61 with social networking site 210, e.g., directly, or via the portable device 53. Communication can occur over a USB protocol, wireless networks (mobile or cellular phone, Wi-Fi) or other machine to machine communication methods. The social networking site 210 may include a data store 211 configured to store the processed, hyperlapse video from the vehicle 30. The video can be processed into a hyperlapse video by taking raw video data from the at least one camera in the vehicle, smoothing the video while reducing the time length of the video.

The portable device 53 may be in communication with the social networking site 210 via a wide-area data connection 214 and with the vehicle 30 via a local data connection 212. A social network application may be installed to the portable device 53 and may be configured to send processed video from the vehicle to the social network 210 or other off vehicle data storage. In an example, the portable device 53 is connected to a suitable wide-area data connection 214 away from the vehicle 30, and provide the uploadable, vehicle-generated videos to the social network when the portable device 53 is either in the vehicle 30, if an appropriate communication link is established and accepted by the user, or when the device 53 is remote from the vehicle 30 and has an appropriate communication link to the social network 210. While an exemplary system 200 is shown in FIG. 2, the exemplary components illustrated in FIG. 2 are not intended to be limiting. Indeed, the system 200 may have more or fewer components, and additional or alternative components and/or implementations may be used.

The VCS 1 may be configured to communicate with the social networking site 210 over the network 61. In some cases, the VCS 1 may make use of integrated network functionality of the VCS 1, such as the internal modem 63, to facilitate communication with the update server 210. In other cases, the VCS 1 may utilize a local data connection 212 to the portable device 53 to facilitate communication with the update server 210 via a wide-area data connection 214 of the portable device 53. As an example, for a portable device 53 running the Android operating system maintained by the Open Handset Alliance of Silicon Valley, Calif., the data connection 212 may be established via a wireless Bluetooth connection or other wireless connection. As another example, for a portable device 53 running the iOS operating system maintained by Apple, Inc. of Cupertino, Calif., the data connection 212 may additionally or alternately be established over a wired USB connection (not shown), a Firewire connection or a Lightning connection. Another connection may be used by a portable device 53 using BB10 by Blackberry Ltd. of Waterloo Ontario, Canada.

The portable device 53 may further be configured to establish a wide-area data connection 214 (e.g., an Internet connection) between the portable device 53 and the social network site 210, such as a connection over the network 61. The portable device 53 may be further configured to maintain information regarding which wide-area data connections 214 may be preferred by the user for downloading information (or which types of wide-area data connections 214). For instance, to avoid mobile data plan overage charges, the portable device 53 may be configured to defer requests to transfer load files when connected to the network 61 via a cellular wide-area data connection 214, and may be configured to handle the download requests (including any deferred requests) when connected to a Wi-Fi wide-area data connections 214. As another possibility, the portable device 53 may be configured to defer requests until the portable device 53 is connected to the network 61 via a wide-area data connection 214 on a list of preferred wide-area data connections 214 (e.g., selected by the user from a network control panel user interface of the portable device 53).

Due to the portable nature of the portable device 53, it should be noted that the portable device 53 may maintain a wide-area data connection 214 in some cases when it is not in communication with the VCS 1 over the data connection 212. As one example, the portable device 53 may utilize the wide-area data connection 214 over a home Wi-Fi network of the user or a public WI-FI when the portable device 53 is not paired with or within the vicinity of the vehicle 30. The portable device 53 can be removed from the vehicle, e.g., carried to and away from the vehicle by the user. In an example, the portable device 53 may store a processed video, e.g., a hyperlapse video, thereon when removed from the vehicle 30. The portable device 53 may send the video to the social network site 210 or other remote storage (e.g., storage 70 in FIG. 1) when the device 53 is remote from the vehicle 30.

The VCS 1 may be configured to communicate with the social network site 210 using a wired connection (at least partly non-wireless connection). The social network site 210 may load a processed video from a memory device, e.g., a USB enabled device, which was connected to the vehicle 30. The memory device can connect to the vehicle at the USB port 23 and download the processed video from the vehicle processor 3 or from the storage 7.

The VCS 1 may be configured to run a social network application 216 that can control interaction with the social networking site 210. For example, the social network application 216 run by the VCS 1 may receive a command from a user requesting a processed video to be uploaded to the social network site 210. As another possibility, the social network application 216 may trigger a periodic check for a new processed video(s) in the storage 7. When triggered, the social network application 216 may be configured to send a request to the user, e.g., through portable device 53 or through a driver-vehicle interface in the vehicle to inquire whether a processed video is available or approved for updating to the social network site 210. An affirmative input will trigger the social network application 216 to upload a processed video, which can be selected by the user through the portable device 53 or driver-vehicle interface, to the social network site 210. The social network application 218 in the portable device may be configured to operate with the vehicle-mounted social network application 216 cause the portable device 53 to send a processed video over any of the network connections to the social network site 210 or other remote storage. For instance, the social network application 218 may be configured to receive a listing of the processed video files, e.g., a hyperlapse video, identified by the vehicle social media application 216 as being available for download to the social media site 210 using criteria established by the social network and the user. Such criteria can be stored in one or both of the applications 216, 218.

By using the facilities of the portable device 53, the vehicle 30 may accordingly be able to have its processed videos (e.g., hyperlapse video) downloaded over wide-area data connections 214 that may be unavailable to the vehicle 30 but available to the portable device 53. Thus, the social network application 218 may allow the portable device 53 to download processed videos when the portable device 53 is away from the vehicle 30 but connected to the network 61.

In some cases, some processed videos in the vehicle may be sent using the portable device 53, while other processed videos may be sent by the vehicle 30. The processed videos are videos processed to remove jitter and shake while compressing the time period of the video.

The sending of processed videos from the vehicle 30 can be performed in the background while the vehicle is in use or anticipated to be in use. The processed videos are digital files, in some cases in the form of compressed data files in machine readable form. The processed videos can be stored in storage 7 and processed using the processor 3. The VCS 1 can schedule the transmitting of the video files for when the transmission will not make an impact on VCS performance and without impacting vehicle operation, including the vehicle infotainment system.

Figure 3:
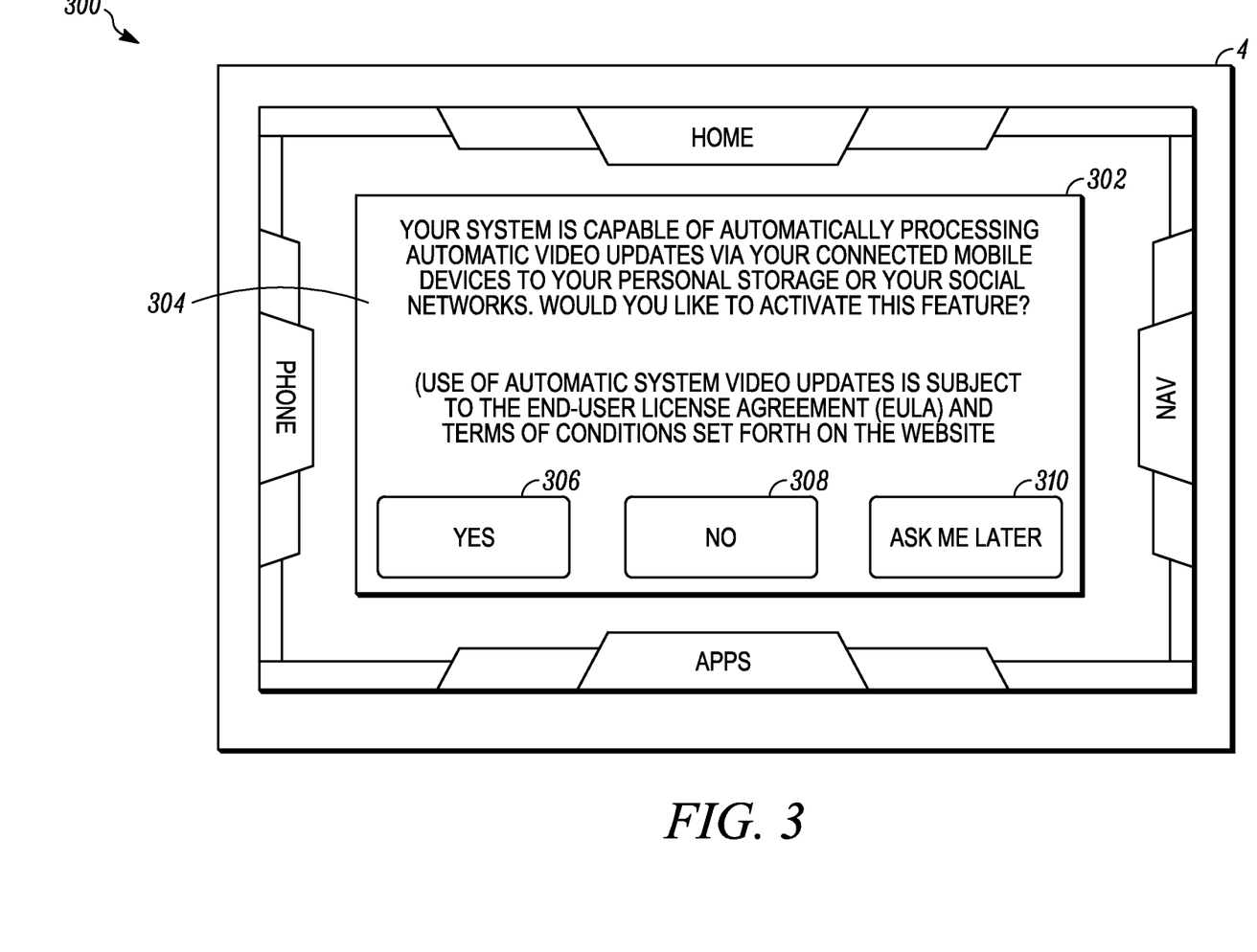
FIG. 3 is view of a vehicle interface according to an example embodiment.

FIG. 3 illustrates an exemplary user interface 300 of the vehicle system 200 for receiving consent from the user to transmit processed video from the vehicle 30, by the portable device 53 or directly by the vehicle 30, to a remote storage or to the social network site 210, e.g., through the network 61. The user interface 300 may be presented by the VCS 1 in the vehicle 30 via the display 4, and may include a message prompt 302 provided by the social network application 216 to request for the user to agree to use of the social network application 218 to send processed videos created by the vehicle 30 to the remote storage or the social network site 210. Where to send the processed video can be a user selected setting in the VCS 1. As illustrated, the message prompt 302 is included in the user interface 300 as a message 304 above other content of the user interface 300. It should be noted that in other examples, the message prompt 302 may be provided in other forms, such as via a full-screen user interface.

The user interface 300 may further include controls configured to receive an indication from the user whether the user agrees to use of the social network application 218 on the portable device 53. As an example, the user interface 300 may include a "yes" control 306 for receiving an indication from the user that the user agrees to use of the social network application 216 or 218, a "no" control 308 for receiving an indication from the user that the user disagrees with use of social network application 216 or 218, and an "ask-me-later" control 310 for receiving an indication from the user that the user wishes to be provided with the message prompt 302 at a later date. If the user agrees to use of either or both of the social network application(s) 216 or 218, then the social network application 216 may utilize the social network application 218 on the portable device to aid in the sending of processed videos to a remote storage or to the social network site 70 or 210. Otherwise, the social network application 216 may fall back to functionality not using the portable device's social network application 218, such as use of the portable device 53 as a data connection (if authorized to do so by the user), use of an internal onboard modem 63 of the VCS 1, or uploading of processed video may be unavailable. The user interface 300 may also be used to indicate to the user via the display that a processed video has been successfully sent to remote storage or a social network site.

The interface 300 may also provide an interaction and input/output point so the vehicle can receive input from a user and output either queries to the user or video to the user. The video being displayed on the interface can be the raw video or the processed video. The processed video can be a hyperlapse video. Any user input to the vehicle described herein can be done through appropriate queries displayed on the interface 300.

Figure 4:
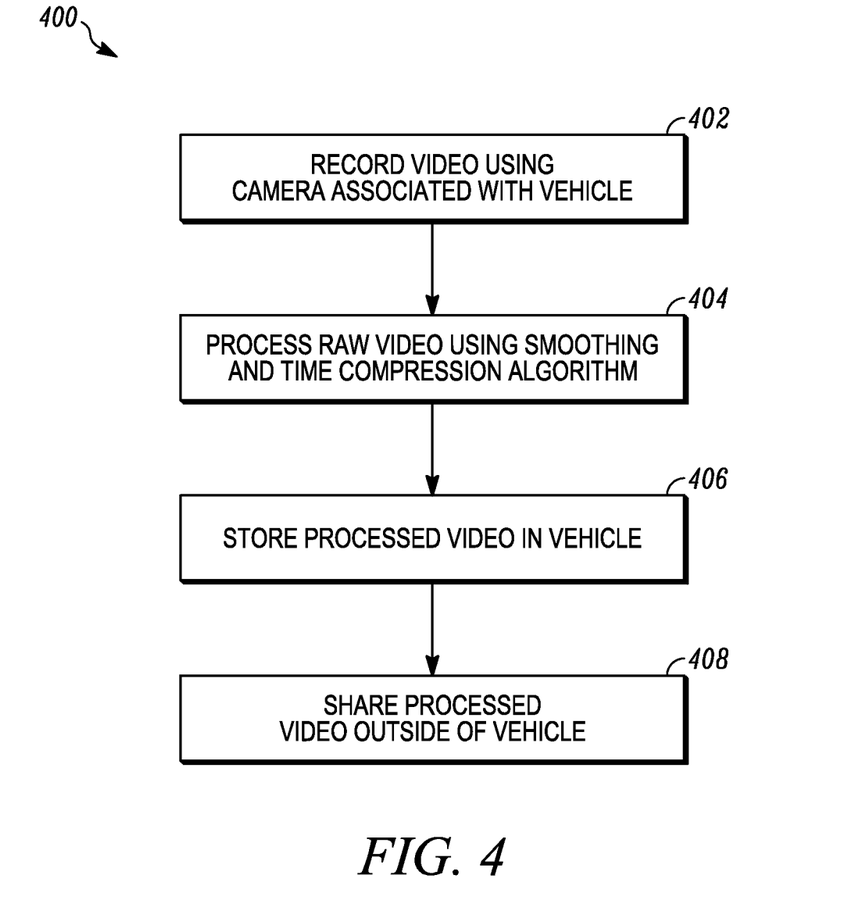
FIG. 4 is flow chart showing a method according to an example embodiment.

FIG. 4 shows a vehicle video method 400 that may be used with the structures described herein. At 402, the vehicle records video with a camera associated with the vehicle. The vehicle can further record video from multiple cameras. The camera may be triggered by user input (e.g., driver input). The camera may be triggered by the vehicle itself implementing rules stored as machine instructions. The rules may be set using an interface or inputs in the vehicle. The rules may also be part of an application (machine instructions) being applied in the vehicle or a computing device associated with the vehicle. These rules may trigger the camera when the vehicle is traveling along route that is not frequently traveled by the vehicle. For example, the camera is instructed to begin recording when the vehicle is not traveling to or from work or along roads that are traveled every day or every week. The rules can also record on vehicle key-on. The vehicle may also store settings to always record video when the vehicle is more than a set distance from the owner's home, e.g., 10 miles, 20 miles, 50 miles and the like. The vehicle may also receive electronic information that the vehicle is nearing a hotspot, whereat video is of interest to a group of which the owner or driver is a member. It will be recognized that video taken from cameras on a vehicle may have significant jitter or shake in the video. This may be caused by vehicle vibrations, road surfaces and driver operation.

At 404, the vehicle processes the raw video from the camera into a smooth, time-compressed video using an algorithm stored in the vehicle as machine instructions. The machine instructions can be updated over the vehicle's electronic communication systems. The algorithm can be a hyperlapse video generation algorithm. The hyperlapse video generation algorithm has all the benefits of time-lapsing without the violent transitions between video frames. The output of this algorithm is a video with smoothed transitions, giving the impression that the viewer is gliding through the scene of the recorded video. In an example, the algorithm reconstructs the video frames using statistical modeling of the data in each frame. This can be done relative to adjacent frames. The algorithm plans a path through the reconstructed frames to lose the least amount of data but smooth the transitions between the frames. The path results in a smooth transition when the video is sped up or reduced in time. Next the algorithm renders a new video using the new path through the video data. This results in a hyperlapse video that is smooth even when sped up to greater than twice the speed even with high frame rate video. A hyperlapse video can be a first-person video that is sped up (e.g., time-lapse) with a smoothly moving camera perspective. At high speed-up rates, simple frame sub-sampling coupled with existing video stabilization methods do not work, because the erratic camera shake present in vehicle camera video is amplified by the speed-up. The unstable video can also be caused by the vehicle in motion on the road due to varying vehicle speed and steering the vehicle around corners. Such changes in vehicle speed or vehicle direction are amplified when the video is sped-up. The algorithm may first reconstruct a three dimensional input camera path as well as dense, per-frame proxy geometries. A novel camera path for the output video is optimized that passes near the input camera position while ensuring that the virtual camera looks in directions that can be rendered well from the video input. Finally the algorithm generates the novel smoothed, time-lapse video by rendering, stitching, and blending appropriately selected source frames for each output frame.

At 406, the processed video is stored in the vehicle storage. In an example, the processed video is a smoothed time-lapse video. In an example, the processed video is a hyperlapse video.

At 408, the processed video is shared from the vehicle. In an example, the video is uploaded from the vehicle to a remote storage, e.g., a server or the user's personal computer. In an example, the video is shared to a social networking site. The social networking site can be hosted on a server. The user (e.g., vehicle owner or vehicle driver) may be is a member of the social networking site. Using communication links between the vehicle and the social networking site, the vehicle can upload a processed video to the social networking site. The social networking site can share the uploaded video according to settings and end user licensing agreement between the site and the user.

Over the connections to the vehicle 30, e.g., directly from the network 61, through the portable device 53 or through input from the user, the vehicle can be informed of a popular event (e.g., a hotspot event) happening at a location where the vehicle is currently or at a location that is predicted the vehicle will be. When a popular event is happening, many drivers may use the vehicle's systems to generate hyperlapse video either at the popular event or when arriving at a popular event. The vehicle can record what is happening from the vehicle perspective. The location and time data can be stored to each of these hyperlapse videos. As a result, these event hotspots can be identified and reported to other users, e.g., over the social networking site 70, 210 or directly to other user's devices connected via network 61. Examples of hotspot events can be news worthy events, e.g. weather events such as thunderstorms, tornadoes, flooding, hurricanes and the like; emergency responder events, among others. Other hotspot events can be other happier events, e.g. driving to a ball game, driving to a concert, driving to a graduation ceremony and the like.

The processed video may include metadata produced by the vehicle 30 that can be used to cluster or group similar videos. Examples of metadata can be location data, time data, etc. A machine learning algorithm at the social networking site could be used to cluster all this data into different hotspots. The hyperlapsed videos can thus be grouped together. Once this is done, a small sample of hyperlapse videos can be sent to other people who are looking for nearby events via their vehicles or mobile devices. These identified hotspots can also be overlapped with known events in an area to help give context to the sample hyperlapse videos that are displayed. In a further example, the user through the vehicle can receive and view additional hyperlapse videos that relate to their current location, their usual travel routes or predicted vehicle travel routes. Such routes can be determined based on prior driving data stored in the vehicle.

The presently described system may be flexible in activation as well as the recording device used. The camera used to perform the recording could be a dash camera, the front view camera, a smartphone, or another recording device that can connect to vehicle 30 through its VCS 1. Activating the camera for video recording and the processor for hyperlapse processing can be done by a command from the driver. A voice command through the vehicle's system can be used to trigger the camera to start recording. The user could also activate the recordings by pressing button in the vehicle cabin for faster system response. In addition to manual (driver) activation, hyperlapse video recording could be triggered automatically by the vehicle. Drivers use their cars for routine drives to/from common destinations, but if they decided to go on a road trip or somewhere out of their normal routine, the vehicle could determine to automatically start recording video for hyperlapse processing. This would be achieved by monitoring data, such as time of day, distance driven, and vehicle, for changes in normal driving patterns that are stored in the vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for a vehicle comprising:
   detecting change in a driving pattern of the vehicle based on monitored data and, driving patterns stored in the vehicle, wherein the monitored data includes time of day or distance driven;
   responsive to the detecting, automatically recording video data using a vehicle camera;
   processing, using a vehicle processor, the video data into hyperlapse video; and
   outputting the hyperlapse video to a social network associated with at least one of a driver of the vehicle and the vehicle,
   wherein the processing includes processing sensed location data into the hyperlapse video such that the hyperlapse video is geotagged and provides global positioning system location information about a route travelled by the vehicle during the recording.

2. The method of claim 1, wherein the outputting includes outputting the video through a portable device in communication with both the vehicle and the social network.

3. The method of claim 1, wherein the outputting includes outputting the video over a network communication device in the vehicle.

4. The method of claim 1, wherein the processing includes reconstructing a video stream from the video data, planning a 3D smooth path through the video stream, and rendering the video data along the smooth path into the hyperlapse video that has a faster speed and less jitter than original video.

5. The method of claim 1, wherein the hyperlapse video is not a native, sped-up video of the recorded video from the vehicle camera and wherein the hyperlapse video includes non-video, sensed data.

6. The method of claim 1, wherein the recording includes receiving information from a source external to the vehicle that the vehicle is near an event trending in social media.

7. The method of claim 1 further comprising embedding, using a controller, vehicle-sensed data about an electric motor of the vehicle into the hyperlapse video.

8. The method of claim 1 further comprising scheduling the outputting such that the outputting does not impact operation of an infotainment system of the vehicle.

9. A method for a vehicle comprising:
   detecting change in a driving pattern of the vehicle based on monitored data and driving patterns stored in the vehicle;
   responsive to the detecting, automatically recording video data using a vehicle camera;
   processing, using a vehicle processor, the video data into hyperlapse video, wherein the processing includes processing sensed location data into the hyperlapse video such that the hyperlapse video is geotagged and provides global positioning system location information about a route travelled by the vehicle during the recording;
   outputting the hyperlapse video to a social network associated with at least one of a driver of the vehicle and the vehicle; and
   scheduling the outputting such that the outputting does not impact operation of an infotainment system of the vehicle.

10. The method of claim 9, wherein the outputting includes outputting the video through a portable device in communication with both the vehicle and the social network.

11. The method of claim 9, wherein the outputting includes outputting the video over a network communication device in. the vehicle.

12. The method of claim 9, wherein the processing includes reconstructing a video stream from the video data, planning a 3D smooth path through the video stream, and rendering the video data along the smooth path into the hyperlapse video that has a faster speed and less jitter than original video.

13. The method of claim 9, wherein the hyperlapse video is not a. native, sped-up video of the recorded video from the vehicle camera and wherein the hyperlapse video includes non-video, sensed data.

14. The method of claim 9, wherein the recording includes receiving information from a source external to the vehicle that the vehicle is near an event trending in social media.

15. The method of claim 9 further comprising embedding, using a controller, vehicle-sensed data about an electric motor of the vehicle into the hyperlapse video.

16. The method of claim 9, wherein the monitored data includes time of day or distance driven.

17. A method for a vehicle comprising:
   detecting change in a driving pattern of the vehicle based on monitored data and driving patterns stored in the vehicle;
   responsive to the detecting, automatically recording video data using a vehicle camera;
   processing, using a vehicle processor, the video data into hyperlapse video; embedding, using a controller, vehicle-sensed data about an electric motor of the vehicle into the hyperlapse video; and
   outputting the hyperlapse video to a social network associated with at least one of a driver of the vehicle and the vehicle, wherein the processing includes processing sensed location. data into the hyperlapse video such that the hyperlapse video is geotagged and provides global positioning system location information about a route travelled by the vehicle during the recording.

18. The method of claim 17, wherein the processing includes reconstructing a video stream :from the video data, planning a 3D smooth path through the video stream, and rendering the video data along the smooth path into the hyperlapse video that has a faster speed and less, itter than original video.

19. The method of claim 17, wherein the hyperlapse video is not a native, sped-up video of the recorded video from the vehicle camera and wherein the hyperlapse video includes non-video, sensed data.

20. The method of claim 17, wherein the recording includes receiving information from a source external to the vehicle that the vehicle is near an event trending in social media.

* * * * *